March 1, 1966 M. KRAJOWSKY ETAL 3,237,518
MOUNTING FOR COMPOUND TELESCOPE HAVING PARALLEL OPTICAL AXES
Original Filed Feb. 7, 1962 3 Sheets-Sheet 1
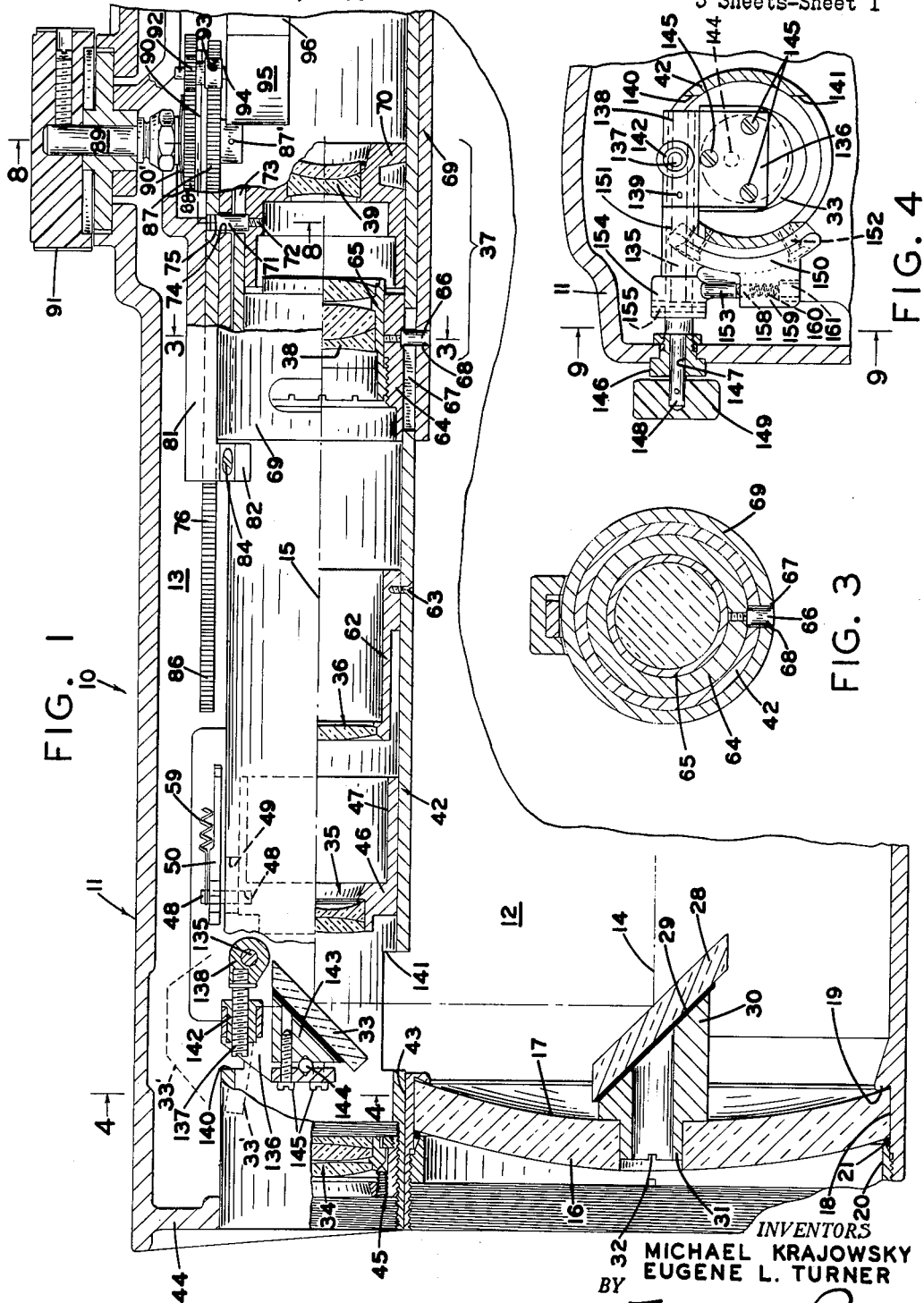
INVENTORS
MICHAEL KRAJOWSKY
EUGENE L. TURNER
BY Frank C. Parker
ATTORNEY

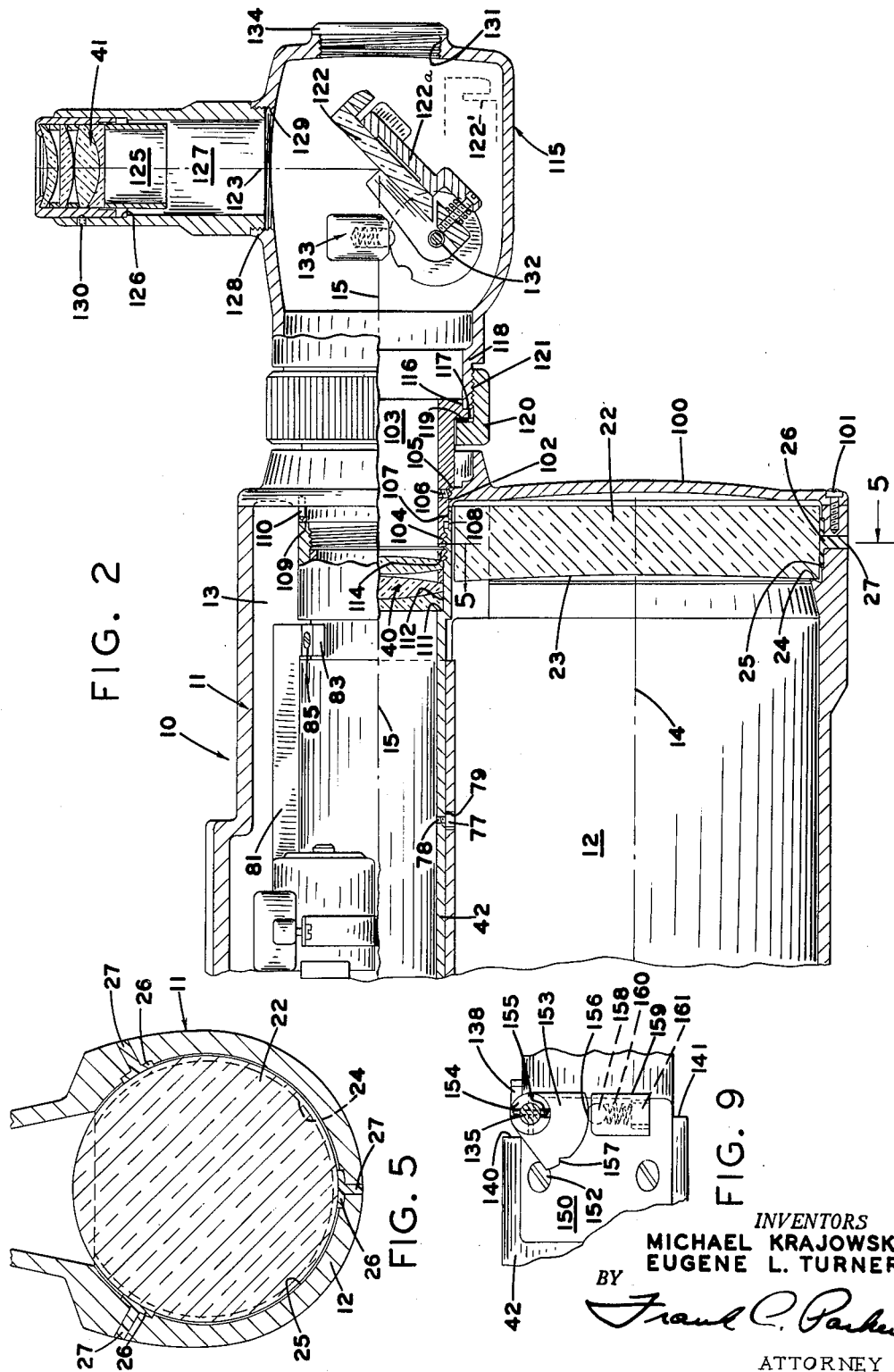

March 1, 1966  M. KRAJOWSKY ETAL  3,237,518
MOUNTING FOR COMPOUND TELESCOPE HAVING PARALLEL OPTICAL AXES
Original Filed Feb. 7, 1962  3 Sheets-Sheet 3
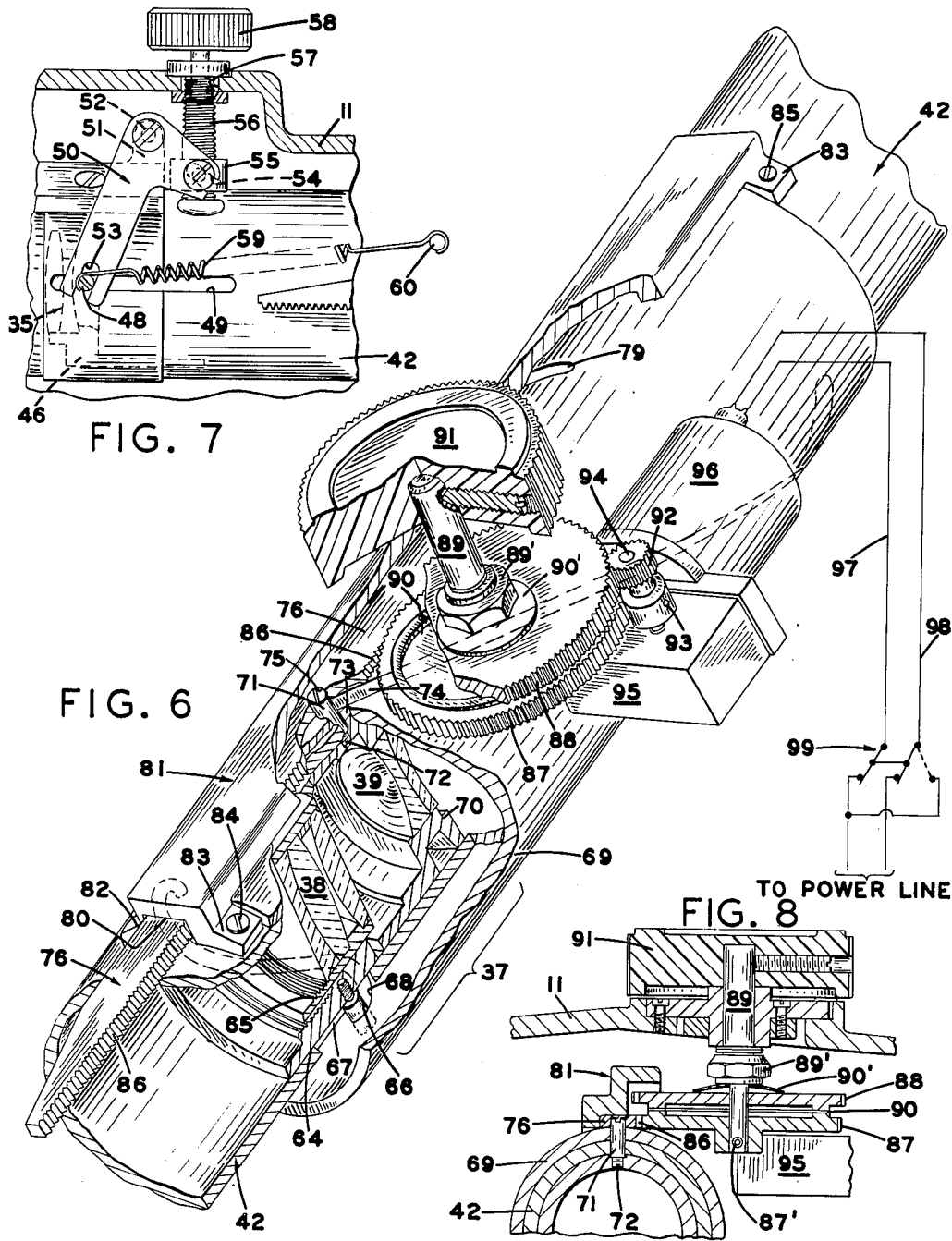
INVENTORS
MICHAEL KRAJOWSKY
EUGENE L. TURNER
BY
Frank C. Parker
ATTORNEY

United States Patent Office 3,237,518
Patented Mar. 1, 1966

3,237,518
MOUNTING FOR COMPOUND TELESCOPE
HAVING PARALLEL OPTICAL AXES
Michael Krajowsky, Rochester, and Eugene L. Turner, Brighton, N.Y., assignors to Bausch & Lomb Incorporated, Rochester, N.Y., a corporation of New York
Original application Feb. 7, 1962, Ser. No. 171,680. Divided and this application Apr. 27, 1964, Ser. No. 367,916
4 Claims. (Cl. 88—32)

This application is a division of our copending application Ser. No. 171,680, filed Feb. 7, 1962, now abandoned.

The present invention relates to a compound telescope and more particularly it relates to the mounting mechanism for the optical parts thereof.

Although astronomical and other compound telescopes have been made for many years in a great number of forms for portable use, the need for an instrument which could be used to continuously vary or "zoom" the magnification of the image during observation has not been met. It is often desirable when conducting a search for comets or when searching for other celestial bodies to be able to change the size of the field of view and/or the size of the observed object quickly and smoothly. This action is particularly useful when the object under observation is transitional in character or rapidly moving. The same desirable features are useful also in corresponding terrestrial observations.

In view of the desirability of the aforementioned features, it is an object of this invention to provide a novel compound telescope, such as for instance an astronomical telescope, having means by which the magnification of the observed image may be quickly and continuously varied.

It is a further object to provide such a telescope which is comparatively light and portable, compact and of good appearance.

It is another object to provide such a device wherein the optical parts are reliably and strongly mounted and held in precise alignment with each other during all operating positions of the moving parts thereof for improving the optical performance.

A further object is to provide a compound telescope at least cost considering its high standard of performance and other advantageous features embodied therein, said telescope being adaptable by reason of its peculiar construction to a considerable number of diverse seeing tasks.

Another object is to provide such a device which is easy to operate either manually or by power, and by reason of its eyepiece design affords comfortable seeing postures for the observer, all of the working parts thereof being compactly arranged and well enclosed and protected against the deleterious effects of foreign matter and moisture.

These and other objects and advantages are to be found in the detailed form and arrangement of the component parts of this invention and in the combinations thereof as found in the specification herebelow, taken in connection with the accompanying drawings, wherein:

FIG. 1 is a side elevation of the front portion of a telescope embodying the present invention, parts thereof being shown in section and partly broken away;

FIG. 2 is a partial side elevation of the rear portion of said telescope, parts thereof being broken away and shown in section;

FIG. 3 is a sectional view taken on the line 3—3 of FIG. 1;

FIG. 4 is a partial sectional view taken on the line 4—4 of FIG. 1 of an operating mechanism comprised in the telescope;

FIG. 5 is a partial sectional view taken on the line 5—5 of FIG. 2;

FIG. 6 is a perespective view of an operating subassembly comprised in said telescope, parts thereof being shown fragmentarily and in section;

FIG. 7 is a plan view of an operating mechanism for a part of the telescope;

FIG. 8 is a sectional view taken on the line 8—8 of FIG. 1; and

FIG. 9 is a side view of certain operating structures shown partly in section taken on the line 9—9 of FIG. 4.

A preferred form of this invention is shown partly in FIG. 1 of the drawing where the numeral 10 designates the telescope generally. For sturdiness and rigidity, an elongated casing 11 is provided having a wide zone 12 and a narrow zone 13 which are integrally formed with each other for the purpose of housing the mounting mechanism for the optical parts.

The telescope 10 comprises two groups of optical parts, one group called the catadioptric or teleobjective group being aligned along a first optical axis 14 in zone 12 of the casing and shown jointly in FIGS. 1 and 2, and the second group called the finder telescope being aligned in the narrow zone 13 of the casing along a second axis 15 which is parallel to axis 14, said finder telescope also having the auxiliary scanning function as found in large telescopes. It will be seen that about half of the mechanism of the teleobjective group and half of the mechanism of the finder telescope group is shown in any single drawing.

Referring first to the catadioptric group, the light rays enter the telescope 10 through a corrector lens 16 having a rear surface 17. Said lens 16 is held on a lens seat 18 formed in the wide zone 12 of the casing 11, said seat terminating rearwardly in an annular shoulder 19 against which the lens surface 17 is held. For urging the lens 16 against shoulder 19, a ring nut 20 which is threaded on the inner surface of said casing is utilized and a suitable sealing ring 21 is held under pressure between the nut and the lens.

Coaxially with the corrector lens 16 and rearwardly thereof is mounted a spherical mirror 22, the reflective surface 23 thereof being held for good optical alignment against a partial annular shoulder 24 formed within the wide zone 12 of the casing 11. Contiguous to said shoulder 24 is formed a cylindrical seat 25 which is radially spaced from the periphery of the mirror as shown in FIG. 2.

For the purpose of locking the mirror 22 permanently on its seat 25 subsequent to being seated against the shoulder 24, a suitable thermoplastic resinous cement 26 is forced through a plurality of radial feed holes 27 which are formed in the casing 12 as shown in FIG. 5 so as to provide a plurality of pads on which the mirror is solely held, both radially and axially.

Image rays reflected by the mirror 22 are directed onto a flat mirror 28 which is obliquely held so as to deflect said rays laterally of axis 14 toward the axis 15. Said flat mirror 28 is preferably first adhesively secured by a suitable cement onto an inclined face 29 of a hollow center post or stand 30 on which a shouldered pilot 31 is formed. Lens 16 is bored at the center to receive said pilot 31 and the mirror and stand are assembled therein. Said mirror 28 is first assembled on post 30, which is then assembled on lens 16 and is cemented therein after the mirror 28 has been properly aligned with the finder axis 15. This operation is effected by means of inserting a tool in a slot 32 and rotating the mirror stand 30 until optical alignment is established.

In the narrow zone 13 of casing 11 is mounted the second optical group which receives the image rays from the catadioptric optical system onto an adjustable and movable inclined mirror 33 as described hereinafter.

In the preferred form as shown jointly by FIGS. 1, 2 and 6, the finder telescope includes in progressive order and in mutual optical alignment on the axis 15 an objective lens member 34, a focusing lens member 35, a field lens 36, a zoom lens system 37 consisting of a front zoom lens 38 and a rear lens 39. Aligned rearwardly thereof in the finder group is an erector lens member 40 and a subsequent eyepiece 41.

Advantageously for optical alignment and rigidity purposes, all of the above-recited optical components except the eyepiece 41 in the finder optical group are held in a stationary mounting tube 42 which is closely fitted at its forward end in a bearing 43. Said bearing is formed in a front wall 44 which is preferably constructed integrally with said casing 11. The rear support for the mounting tube is described hereinafter in connection with the eyepiece mounting.

In the front end of the stationary mounting tube 42 a first lens cell 45, wherein the objective lens 34 is secured by any suitable means such as cementing, is preferably threaded for axial and suitable lateral adjustments therein. Rearwardly of lens cell 45, a second lens cell 46 is provided wherein the focusing lens 35 is suitably fixed as by cementing, said cell having a rearwardly extending sleeve 47 formed thereon which is slidably fitted on the inner diameter of the mounting tube 42.

Internal focusing means as best shown in FIG. 7 of the drawing is provided for the focusing lens 35, said means comprising an actuating pin 48 which is suitably fixed radially by thread means or otherwise in the lens cell 46. Said pin 48 projects radially outwardly through a free-fitting axially formed slot 49 in the stationary tube 42 and projecting therebeyond into engagement with a bell crank type of operating lever 50. Carried by the tube 42 is a stationary lug 51 wherein a pivot pin 52 is suitably fixed on which said operating lever 50 swings. At the point of engagement of the actuating pin 48, a free-fitting elongated slot 53 is formed in one end of the operating lever 50 to provide therewith a relative sliding connection. On the other branch of the bell crank lever 50 similar pin and slot connection generally indicated by numeral 54 is provided, the pin thereof being fixed in a nut 55 which is threaded on a control shaft 56. The shaft 56 is suitably journaled in a bearing 57 mounted in said casing 11 and projects outwardly therefrom so that an exterior control knob 58 may be fixed thereon. For preventing backlash in the above-described operating mechanism, a suitable tension spring 59 is anchored at one end to a stationary peg 60 and at its other end is attached to the actuating pin 48.

Rearwardly of the focusing lens 35, the field lens 36 is fixed in an elongated lens cell 62 by any suitable means such as cementing. Said lens cell 62 is fastened in a fixed position in the mounting tube 42 by two screws 63 which are 90° apart and which are held in fitted openings in said tube and are threaded into tapped holes in the lens cell 62.

Spaced still further rearwardly in the stationary mounting tube 42 is the aforesaid zoom lens system 37 comprising front zoom lens 38 which is adjustably held in a movable zoom lens cell 64. Preferably the lens 38 is cemented directly in a lens holding ring 65 which is threaded for longitudinal adjustment within the cell 64. For effecting zooming motion of the zoom lens 38, a zoom actuating pin 66 is suitably anchored in the lens cell 64 so as to project radially through a slidably fitted straight slot 67 formed longitudinally in the mounting tube 42 and engage slidably within a curved slot 68 formed in an operating sleeve 69, as shown in FIGS. 1 and 6.

For mounting the aforesaid rear zoom lens 39, a second movable zoom lens cell 70 is provided wherein the lens is suitably fixed as by cementing, said cell being slidably fitted within the mounting tube 42. Zooming motion is communicated to the lens cell 70 by a pin 71 which is secured in said cell radially by thread means 72 so that said pin extends through an axially disposed slidably fitted straight slot 73 formed in the mounting tube 42. Said pin 71 extends outwardly therebeyond through a slidably fitted helical slot 74 formed in the operating sleeve 69 and is engaged tightly at its outer end within a closely fitted bore 75 formed in an operating bar 76.

The means for actuating the zoom optical system 37 embodies a novel and advantageous combination of mechanism which is shown generally in FIG. 6 and in a lesser degree in FIG. 1. As best shown in FIG. 6, the zoom actuating force is a longitudinal force applied solely by the operating bar 76 through the zoom actuating pin 71 in the first instance, directly to the zoom lens cell 70 and in the second instance, a rotary force is transmitted therefrom to the second zoom lens cell 64 indirectly through the operating sleeve 69.

With regard to the operation of the lens cell 70, the operating sleeve 69 is rotatably mounted on the outer diameter of the stationary tube 42 and is restrained from relative longitudinal motion thereon by a pin 77 FIG. 2 which is fixed in any preferred manner such as the thread 78 in the wall of the stationary mounting tube 42. Said pin 77 cooperates with a transverse circumferential slot 79 of required angular extent which is formed in the operating sleeve 69 in such a manner as to fulfill its stated purpose.

By the above-described mechanism, the zoom actuating pin 71 in its longitudinal travel causes the operating sleeve 69 to rotate through the action of the helical slot 74 so that the irregularly curved slot 68 consequently rotates and moves the zoom lens cell 64 axially. This arrangement and construction of the zoom actuating mechanism has, among other features, the distinct advantage that it is reversible and easily operated with substantially equal operating force in either direction while at the same time the configuration of the slots 68 and 74 is so chosen as to cause properly related motions of the zoom lens cells 64 and 70.

The aforesaid operating bar 76 is mounted slidably for longitudinal motion in an elongated slot 80 formed in the underside of an elongated housing 81 in such a spaced relation to the outer diameter of the operating sleeve 69 that together these parts form a four-sided channel wherein the bar travels. In order to hold the housing 81 in such a position, laterally protruding feet 82 and 83 are formed on the opposite ends thereof in spaced relation to the ends of the operating sleeve 69 and are secured by suitable means such as screws 84 and 85 which project through openings in said feet and are threaded into tapped holes in the stationary tube 42.

Manual and/or power means are provided to move the operating bar 76 comprising a rack 86 formed along one edge of said bar as shown in FIG. 6. In meshing engagement with the rack 86, is provided a primary drive gear 87, said gear and a secondary drive gear 88 being rotatably mounted together on a shaft 89. A suitable friction drive clutch 90 is located between the gears 87 and 88 and the effective pressure of the clutch is provided by a suitably arranged disk spring 90' seated beneath a nut 89' which is threaded onto shaft 89.

The primary drive gear 87 is fixed in any preferred manner, such as the drive pin 87', to said shaft 89 and on the other end thereof a knob 91 is secured for manual operation thereof. In mesh with the secondary drive gear 88 is a drive pinion 92 which is drivingly connected by a suitable connecting device such as a set screw 93 to a power shaft 94 and to a gear box 95 which is part of a motor 96 whereby gear 88 is rotated. By this mechanism the rack 86 may be moved manually to zoom the lens system when the motor 96 is idle. For energizing the motor 96 an operative electrical circuit including the conductors 97 and 98 and a reversing switch 99 is provided in connection with a source of electrical power, as indicated in FIG. 6.

The rear end of the casting 11 is closed by a closure plate or cover 100 which is secured demountably around its periphery to said casing by cap screws 101 which extend through screw holes in the cover and are threaded into corresponding tapped holes in said casing. Closure plate 100 is not only used as a cover to exclude foreign matter and moisture but it also effectively serves as a support for the rear end of the stationary mounting tube 42. For this purpose, a bore 102 is formed in the cover 100 and into said bore is fitted a tubular coupling or retainer member 103 which is threaded at 104 into a mating thread formed on the inside surface of said tube 42. In its midsection, a radial shoulder 105 is formed on coupling member 103, said shoulder being drawn into abutting position against the cover plate 100 by the threads 104 to clamp the rear end of the tube 42 against said plate. A lock screw 106 threaded into the wall of the coupling or retainer member 103 serves to prevent various stresses and vibration from releasing or loosening the clamping action. Forwardly of the shoulder 105 on the coupling member is formed a cylindrical bearing surface 107 which is closely fitted to the aforesaid bore 102, said surface being extended forwardly of said bore so as to slidably fit within a corresponding counterbore 108 formed in the rear end of mounting tube 42 whereby the tube is accurately centralized with the coupling member and a strong support therefor is assured. To prevent the stationary mounting tube 42 from rotating, and automatically providing alignment between internal and external components, a parallel-side notch 109 is formed in the rear end thereof and an axially projecting element such as a pin 110 is secured in the closure plate 100 and fitted between the sides of the notch.

In the rear end of the mounting tube 42, an abutment shoulder 111 and a contiguous lens seating surface 112 are formed whereon the erector lens 40 is held, said lens being clamped against the shoulder 111 by a clamping ring 114 threaded into a thread formed on the interior of tube 42.

In this respect, it is important to note that the coupling or retainer member 103 is so constructed as to serve a plurality of functions which are: (1) To clamp the mounting tube 42 against the plate 100; (2) to laterally locate the tube 42 with regard to the plate 100 to provide reliable optical alignment of the lens system; (3) to serve as a support member for carrying the eyepiece housing of the instrument as described hereinafter.

On the rear end of the coupling member 103 an eyepiece housing which is generally designated by the numeral 115 is carried. For locating the housing 115 laterally and longitudinally with reference to said coupling member, an annular surface 116 and a contiguous abutment shoulder 117 are formed on the rear end of the coupling member whereon an annular extension 118 of housing 115 is fitted. Forwardly spaced from the shoulder 117, a radial clamping surface 119 is formed on the coupling member 103 against which a clamping ring 120 is adapted to be clamped to provide a swivel connection between the member and the housing. To this end, a threaded connection 121 cooperatively formed on the adjacent parts of the clamping ring 120 and the eyepiece housing 115 is provided to secure the two members together in any desired relative angular orientation.

In the body of the housing 115 is provided a movable flat mirror 122 which is inclined in one operative position at 45° to the optical axis 15 so as to deflect image rays laterally along an optical exis 123 which is a property of the eyepiece lens 41. The lens system 41 is mounted in a lens cell 125 which is slidably fitted within a counterbore 126 formed in an eyepiece mounting tube 127 which is secured by the threaded connection 128 into a lateral opening 129 in the eyepiece housing 115. A set screw 130 is threaded into a tapped hole in tube 127 to lock the cell 125 in the counterbore 126.

When the mirror 122 is positioned to serve a laterally positioned lens system 41, the reflective surface thereof is coincident with the point of intersection of the axes 15 and 123. A second opening 131 which is coaxial with axis 15 is formed in the end wall of the housing 115 and this opening is threaded exactly like the opening 129 so that the eyepiece tube 127 may be used in axial position if desired. To facilitate such a use, the mirror 122 may be swung about the axle 132 of its mounting mechanism to the dotted line position 122', FIG. 2, so that the image rays pass directly through the opening 131. Suitable detent mechanism 133 of any preferred design such as shown in FIG. 2 is provided in operative connection to the mirror mounting mechanism to reliably retain the mirror 122 in either of two operative positions. A removable closure cap 134 is provided for the opening 131. Mirror 122 is mounted by suitable tip and tilt adjusting mechanism, constructed on its support 122a, so that optical alignment of the optical system may be accomplished in much the same manner as that described hereafter in connection with the mirror 33.

As aforesaid, the plane mirror 33 is movably mounted to swing about the axis of a mounting shaft 135 as best shown in FIG. 4 so that the mirror has an operative position extending at 45 degrees inclination to the axis 15 as indicated in full lines or it may be moved to the inoperative position indicated by dotted lines 33' in FIG. 1 when it is desired to use only the finder telescope. On shaft 135 is held a mirror frame 136 by means of a mounting stud 137 which is threaded at one end into an anchor block 138, said block being fixed by the crosspin 139 to shaft 135 so that mirror 33 is held in alignment with a pair of oppositely formed openings 140 and 141 in the mounting tube 42.

Axial positioning of the mirror 33 is secured by threading the frame 136 onto the other end of the stud 137, the threaded connection actually being formed in a nut 142 which is rotatably held in said frame.

Adjustments for tip and tilt of the mirror 33 are provided by affixing a mirror block 143 adhesively to the mirror and interposing a single bearing ball 114 between the mirror block 143 and mirror frame 136. Three adjusting and holding screws 145 which are angularly and radially spaced about the ball 144 are passed through loose holes in the frame 136 and are threaded into the mirror block 143 so that by selective relative adjustments of the three screws, an infinite variety of adjustments for tip and tilt of the mirror are effected.

In the casing 11 is formed an opening wherein a suitable sleeve bearing member 146 is suitably secured. Through the center of said bearing member, a bore 147 is provided in which a shaft extension 148 of shaft 135 is journaled. Shaft extension 148 projects outwardly of the casing 11 and on the outer end thereof a manually operated knob 149 is fixed by which the aforesaid swinging motion of mirror 33 is effected.

As best shown in FIG. 4, the shaft 135 is supported near its inboard end in a curved mounting plate 150 having a bearing portion 151 formed thereon which is bored to fit and rotatably hold the operating shaft 135 therein in good alignment with the sleeve 146. For affixing the curved plate 150 to the mounting tube 42, suitable screws 152 extend through fitted holes in said plate and are threaded into tapped holes in said mounting tube.

For the purpose of holding the mirror 33 in either operative or inoperative position, detent means are provided as shown in FIG. 9 of the drawings. Said means comprise a fan shaped plate 153 having a hub 154 which is secured to the shaft 135 by a cross pin 155. The plate 153 is provided with a working surface along its edge in which two angularly spaced notches 156 and 157 are formed in operative and inoperative positions respectively. Cooperating with the notches 156 and 157 is a spring detent of any desired form such as the ball 158 which is retained in a bore formed in a boss 159. Said boss is preferably made integral with the curved plate 150 and in said bore is retained a detent spring 160 seated against a threaded plug 161, said spring being seated at its upper end against said ball 158 to apply pressure thereto.

A study of the foregoing description discloses many advantageous useful features which include a rigid self-contained and sturdy housing and a relatively simple, reliable and precise means of mounting the component optical parts of the telescope particularly the zoom optical system, said parts being relatively adjustably fixed therein and being well enclosed to protect said parts from damage of foreign material, mechanical damage or moisture.

Although only a preferred form of this invention has been shown and described in detail, other forms, modifications and arrangements may be made within the spirit of this invention as defined in the claims appended hereto.

We claim:

1. A catadioptric astronomical telescope having a zoom type of optical system and a catadioptric optical system cooperatively associated and aligned on two parallel optical axes,
   a tubular casing wherein said zoom system and said catadioptric system are mounted and housed,
   an end wall formed in the front end of said casing and a circular bearing surface defining an opening formed therein,
   a rear closure wall demountably secured to the rear end of said casing,
   a stationary mounting tube wherein said zoom system is held,
   means operatively formed on the forward end of said stationary tube and fitting said circular bearing surface for supporting said tube,
   interfitting means cooperatively formed in said closure wall and on the rear end of said stationary mounting tube for supporting the rear end of said tube in said closure wall,
   means for securing said catadioptric optical system in operative position on one of said axes in said casing, and
   mirror means operatively arranged between said zoom system and catadioptric system for relaying image rays from one system to the other.

2. A compound telescope having in combination
   a zoom type of optical system and a catadioptric optical system cooperatively associated and aligned on two parallel optical axes,
   a tubular casing,
   a corrector lens and
   a spherical mirror comprised in said catadioptric system,
   means for holding said lens and mirror in optical alignment with each other and with said zoom system in the front and rear parts respectively of said casing,
   a stationary tube wherein said zoom system is mounted,
   means in the front end of said casing for demountably holding the front end of said tube in laterally spaced relation to said catadioptric system,
   a closure plate for the rear end of said casing,
   means longitudinally aligned with the means for holding the front of said tube for securing the rear end of said tube to said plate so that said tube and plate form a sub-assembly, and
   means for demountably attaching said closure plate to the casing whereby the zoom optical system may seperately be assembled on and disassembled from the casing without disturbing said catadioptric system.

3. A telescope as set forth in claim 2 wherein the means for securing the rear end of said stationary tube is characterized by
   a circular seating surface which defines a bore in said plate and is further characterized by
   a coupling member having an annular surface which is fitted within said circular seating surface and having an abutment shoulder formed thereon at the rear terminal portion of said bearing surface for abutment against the outer surface of said closure plate, said coupling member having a cylindrical extension which is fitted to and carries the rear end of said tube,
   an eyepiece housing, and
   means cooperatively formed on said coupling member and housing for supporting the housing on the member.

4. Mechanical mounting mechanism for compound astronomical telescope having a zoom optical system and a catadioptric system which are cooperatively aligned on parallel axes,
   a casing in which the zoom system and catadiotric system are held,
   a stationary tube in which said zoom system is mounted,
   a closure plate demountably secured to the rear end of said casing and having formed therein a circular seating surface which defines an opening through the plate,
   a coupling member whereon a cylindrical surface is formed so as to closely fit said seating surface,
   an abutment shoulder formed on the coupling member adjacent to the rear of said cylindrical surface for contact with said plate, said cylindrical surface having a connecting portion formed thereon and projecting within said stationary tube,
   a threaded connection cooperatively formed on said connecting portion and tube so as to clamp the plate between the end of said tube and said shoulder,
   an eyepiece housing wherein a laterally directed eyepiece is held, and
   a swivel connection including a pair of circular interfitted bearing surfaces which are formed on the housing and coupling member respectively substantially concentric with the optical axis of said zoom optical system, the connection being operatively constructed so that the housing may be clamped to the member in any angular position and maintain the optical alignment with both of the aforesaid optical systems.

References Cited by the Examiner

UNITED STATES PATENTS

| | | | |
|---|---|---|---|
| 2,409,186 | 10/1946 | Bouwers | 88—32 |
| 2,988,955 | 6/1961 | Goto et al. | 88—57 |

FOREIGN PATENTS

| | | |
|---|---|---|
| 603,569 | 6/1948 | Great Britain. |

JEWELL H. PEDERSEN, *Primary Examiner.*